Patented Oct. 9, 1934

1,976,361

UNITED STATES PATENT OFFICE 1,976,361

MANUFACTURE OF ANHYDROUS DEXTROSE

William B. Newkirk, Western Springs, Ill., assignor to International Patents Development Company, Wilmington, Del., a corporation of Delaware No Drawing. Application July 19, 1930, Serial No. 469,267

9 Claims. (Cl. 127—58)

My invention relates to the manufacture of anhydrous dextrose from starch converted dextrose solutions; and the primary object of the invention is to provide certain improvements upon the method of manufacturing dextrose disclosed in my prior patent, No. 1,722,761, patented July 30, 1929.

This patent discloses a process of bringing about crystallization of dextrose in the vacuum pan instead of in crystallizers as described in my prior patents. The process is carried on in three stages. In the first stage the solution is concentrated to approximately saturation by boiling under a vacuum. In the second or graining stage the induction of crystals in a proper quantity is brought about, either with or without the aid of seed crystals. In the third or building up stage substantially no new crystals are formed but the crystals already present in the solution are built upon until as much as possible of the dextrose in the solution has been changed from the liquid to the solid phase and/or the crystals in the massecuite have reached the desired size.

The improvements of my present invention comprise:

(a) Graining a small charge in a small vacuum pan and transferring the grained charge to the larger pan. This procedure has the additional advantage of saving the time consumed by the operation in the large pan and therefore minimizing equipment.

(b) Leaving a portion of the finished batch in the vacuum pan to serve as a grained charge for the next batch.

(c) Leaving a portion of the grained charge produced in the small pan in such small pan so that such foots will serve to initiate and control the production of the next grained charge.

These procedures (a), (b), and (c) are alternative procedures but based upon the common principle of utilizing a relatively small grained charge, the crystals of which will be built upon during the third stage of the process.

(d) Stopping the induction of crystals at the end of the second stage by raising the temperature of the massecuite. This may be done in conjunction with the introduction of fresh liquor, the expedient for stopping induction, through lowered supersaturation, described in the above mentioned patent.

(e) The maintenance of temperature in the third stage of the process at higher levels than in the patented process. That is instead of reducing the temperature of the pan after the requisite number of crystals have been induced and maintaining the temperature at the reduced level during the building up of the crystals, as described in the patent, the present improvement involves increasing the temperature for the reason stated under (d) above and maintaining the batch at this high temperature during the first part, at least, of the third stage of the process. The advantage resulting is a saving of time, since high temperatures increase the rate of tautomeric changes in the solution which bring about crystallization of the solid phase type desired.

(f) A gradual or controlled reduction in temperature at or near the end of the third stage in order to bring about as complete a crystallization as possible of the dextrose in solution, that is to say a maximum yield. This procedure is optional, dependent ordinarily, upon whether the massecuite is to be finished in the vacuum pan or is to be given a further treatment in crystallizers at atmospheric pressure. In the former case it is desirable to bring about considerable drop in temperature at the end of the third stage. In the latter case I regard it more advantageous, under ordinary conditions, to keep up the temperature throughout the third stage so that the batch will be in the vacuum pan, the more expensive equipment, as short a time as possible, and so that there will be as great a temperature drop as possible in the crystallizers.

(g) The employment of higher temperatures for making the beta anhydrous than stated as preferable in the patent. It has been found to be possible and advantageous to operate for beta at 30° F. higher than for alpha, specifically at a temperature of approximately 190° F.

(h) The use of warm water, approximately 120° F., or above, for washing the sugar in the centrifugal machine where the purging is slow, due, for instance, to lack of uniformity in the size of the crystals, or where an appreciable supersaturation exists in the mother liquor. Under these conditions if cold water be used there is danger that the anhydrous crystals will be changed into hydrate crystals or that hydrate crystals will be induced by the chilling of the mother liquor.

These improvements do not involve any radical departure from the principles of operation of the patented process. Their general purpose is to obtain, in comparison with the procedures described in the patent, increased efficiency, greater certainty of control and lower manufacturing cost.

The following is a specific example of the improved method as applied to the manufacture of alpha anhydrous dextrose: A starch converted dextrose solution of the usual relatively light gravity, say 30° Baumé or less, and of a purity of 96° (reducing sugar calculated as dextrose on dry substance basis) and in quantities from 1/10 to 1/5 by volume of the final batch, is introduced into a vacuum pan large enough to hold the ultimate batch and boiled until a temperature of about 140° F. is reached with a vacuum of 26 inches of mercury. This temperature may vary from 120° F. up to the boiling point at atmospheric pressure but substantially the temperature given is to be preferred. At a supersaturation of about 5% (depending on the rate of circulation of the massecuite in the pan) the formation of new crystals will commence. The temperature is maintained until crystals have been induced in the requisite number. The amount of grain thus produced can be varied considerably. The crystallized sugar may be somewhat less than one-half of one percent of the dextrose in the original solution. If the number of crystals is substantially increased, the ultimate size of the sugar granules will be small. If a smaller number of crystals are induced in the graining stage of the process, the size of the granules of the finished sugar will be increased. However, if the number of crystals is too small in the grained charge the yield will be small and the control will have to be more closely watched to prevent false grain or undue lack of uniformity in size of the ultimate granules. If the number of crystals is too large, the limit of boiling, dependent upon the maintenance of fluidity, will be reached too soon, resulting in a short batch, that is, low yield on equipment basis.

Instead of graining an initially small batch in the large vacuum pan, a charge of the converted liquor, of the size indicated, may be grained in a small vacuum pan and transferred to the regular size pan in which the operation is to be completed. In that case the vacuum and temperature will be the same. The advantages of this procedure are that a more accurate control is possible with the small pan and the duration of use of the large and more expensive equipment is shortened.

In either of the above procedures small amounts of dry seed, 1% or less, may be introduced at the point of supersaturation to hasten induction. Generally, however, this is not necessary.

Instead of either of these procedures one may leave in the large pan a portion of the finished massecuite, as foots, in whatever amount is required for the size of the crystals ultimately desired. The larger the amount of foots left in the pan for the next batch, the smaller the ultimate granules, and vice versa. Where foots are used the body of foots takes the place of the grained charge and this practice can only be repeated a few times otherwise the grains and the voids between them will be too large for satisfactory operation.

When the graining stage is complete and sufficient crystal nuclei are present or have been formed by any of the procedures above described, a small charge of converter liquor, preferably not over 5% by volume of the material in the pan at the time, is introduced into the vacuum pan. This converter liquor may be of the ordinary gravity, for example 30° Baumé. The vacuum is then reduced to approximately 23 inches of mercury, whereupon the temperature will rise to about 160° F. This temperature may be varied over a wide range from 120° F. to the boiling point at atmospheric pressure, but substantially the temperature given is to be preferred. The boiling is continued and fresh converter liquor is added in this manner, that is in small batches from time to time; the fresh liquor being added in such manner as to maintain the temperature at approximately 160° and the degree of supersaturation as high as possible without forcing out false grain, which latter results if the supersaturation exceeds the rate of tautomeric change in the solution. For a temperature of 160° it is desirable that the density of the solution should be about 42°–43° Baumé. The supersaturation is kept high in order to speed the operation up as much as possible—an important consideration in view of the relatively expensive character of the evaporating apparatus. Speed is more important, than with the method of crystallization at atmospheric pressure on the principle of maintenance of supersaturation by temperature drop where the original cost and the cost of maintenance of the equipment is much less than in a process involving the use of vacuum pans.

When three fourths of the batch is in the vacuum pan the vacuum is gradually increased with consequent lowering of temperature, the remaining portion of the batch being added in small quantities as before. Ultimately the vacuum may go as high as 26.5 inches and the temperature as low as 135° F. This will give a massecuite quite stiff with crystals. The mother liquor may have a dry substance content of 70% and the massecuite 90% to 92%, yielding a total of 65% or more dry substance sugar on the weight of massecuite going to the centrifugal machine. These figures are to be taken as typically illustrative merely.

If, however, the batch is to be only partially crystallized in the vacuum pan and is to be finished in crystallizers at atmospheric pressure, it is desirable to keep up the high temperature in the vacuum pan until the end of the strike. This shortens the period of treatment in the expensive apparatus and gives scope for a long drop of temperature in the crystallizers.

Or the massecuite may be boiled at increasing temperatures, especially when the discharge to crystallizers is contemplated. Raising of the temperature will tend to decrease supersaturation but on the other hand it will increase the rate of tautomeric change.

In view of these considerations it will be seen that considerable latitude in the matter of temperature is contemplated, depending upon circumstances.

The specific example just given is to be regarded as illustrative of the principles of the invention but not as excluding modifications of the procedures specified in respect not only to temperatures but other operating conditions.

The initial density of 30° Baumé is the ordinary density of converter liquor after it has been neutralized and put over bone black or otherwise subjected to the influence of an adsorption agent. This density is of no particular importance since the first step of the process is to concentrate the liquor. Generally speaking in the manufacture of anhydrous dextrose, the higher the purity the less need there is for the use of seed crystals to bring about graining. On the other hand the larger the amount of seed crystals which are used, particularly where the seed crystals are in a nascent form as foots, the less heed has to be paid to the temperatures and other controlling conditions.

In the first stage the boiling can be at practically any temperature from 120° F. up to 240° F. This refers to the concentrating stage until a crystallizing supersaturation has been reached.

While it is preferable to add light liquor (converter liquor at 30° Baumé) to the batch to stop induction, water might be used for this purpose. The amount of light liquor or water added in this way must be calculated so as to reduce supersaturation below a point at which new crystals will form but not far enough to stop the sugar from coming out and building on the crystals already formed; and the same principle of control must be followed throughout the third stage of the process. If too much liquor is added at one time the dilution of the massecuite spaces the crystals too widely apart so that there is danger of induction of new crystals which is not desirable at this stage if a uniform and readily purgeable massecuite is the desideratum.

With reference to the temperatures maintained during the third or growing stage of the process, it may be said that the rate of tautomeric change increases as the temperature increases so that the higher the temperature the shorter will be the boiling period.

As to the relation of the solid phase present to supersaturation during the third stage of the process, the closer the crystals are together the higher the supersaturation can be maintained without producing false grain, that is newly induced crystals. Where the crystal nuclei are far apart, the supersaturation must be carried lower in order to maintain purgeable massecuites or at least relatively uniform products.

If the massecuite goes directly from the vacuum pan to the centrifugal machine the temperature leaving the pan should be as low as possible, first, to obtain maximum dry substance yield, and second, to have the difference between the temperature leaving the pan and the temperature in the centrifugal machine as low as possible, so as to prevent secondary crystallization during the centrifuging operation which might result from a considerable and sudden drop to the temperature of the centrifugal machine. On the other hand if the purpose is to finish the batch in a crystallizer at atmospheric pressure, which is desirable particularly with low purity liquors that make it difficult to obtain an adequate yield in the vacuum pan without excessively long treatment, the temperatures in the pan should be carried as high as possible in order to shorten the period that the pan is in use. This gives the massecuite going to the crystallizer a high temperature so that the crystallizer, which maintains supersaturation by continued temperature drop, will operate as efficiently as possible; and as the crystallizer can be operated at a much lower cost and is a less expensive apparatus than the vacuum pan, it is not particularly important to shorten the operation in the crystallizer. Any economical process involves getting as much of the crystallizable sugar out of the mother liquor as possible. The crystallizing operation should therefore be continued until the crystals will rub one against the other. When this stage is reached the operation must stop. There must always be enough mother liquor to lubricate the solids, otherwise the crystals are likely to become broken and hydrate crystals formed so as to make the mass either unpurgeable or difficult to purge.

When graining in the small pan the practice of using foots from a previous batch may be followed or not as desired.

If the purity of the liquor employed is lower than 96%, the percentage of supersaturation required for spontaneous induction, in the graining stage, may be higher than indicated. With a purity of 90% the supersaturation may increase to 8% before spontaneous induction takes place. In referring to the supersaturation by percentages I mean the amount of dextrose in the solution at any given temperature in excess of the amount in equilibrium at that temperature for that solution mixture.

If the massecuite consists of uniform easily purged crystals with little or no supersaturation in the mother liquor, that is if the centrifugal action will remove the mother liquor to the extent that the water can be applied within three minutes after the centrifugal machine is started, it is possible to do the washing with cold water. If there is some variation in crystal size, so that the purging is slower, so that six to ten minutes elapses before the water can be applied or if the mother liquor has an appreciable amount of supersaturation, the massecuite should be washed with hot water, at about 120° F. or above. Of course, the hot or warm water could be used on the more readily purgeable massecuite, first mentioned, if desired. If the massecuite evidences large divergence in the size of crystals so that spinning requires more than ten minutes, for example, or if the mother liquor carries a high supersaturation so that new crystals are induced in the centrifugal machines, the centrifuging operation should not be followed by washing with water at all. That is purging must be accomplished, so far as it is possible to accomplish it at all, by the use of centrifugal force alone, which necessarily means a longer period in the centrifugal machine or a product of less than 100% purity. Under ordinary factory practice it is advisable to wash the crystals in the centrifugal machine in water at about 120° Fahrenheit. While this involves the disadvantage that, due to the higher temperature, more sugar is dissolved by the washing operation, it avoids a much greater evil, namely the danger that a secondary crystallization will take place in the centrifugal machine. This secondary crystallization takes place more readily when the wash water is at the usual tap temperature than when heated to the temperature indicated. In the crystallization of hydrate dextrose under crystallizer practice at atmospheric pressure, the crystallized massecuite is discharged to the centrifugal machine at a temperature between 80° and 90° Fahrenheit, so that if water at ordinary tap temperature is used, the resulting syrup will not be supersaturated, and, therefore, there is no tendency to a re-crystallization. In the production of anhydrous dextrose according to the present process, the batch may be discharged to the centrifugal machine from 120 to 140°, and it has been found that if cold water is used for washing a syrup results, which on account of the temperature reduction becomes supersaturated, resulting in the formation of minute crystals, particularly in the outer portion of the centrifuged cake. This prevents the wash water from freely flowing through the cake, and this in turn results in further secondary crystallization. It is immaterial whether these crystals are anhydrous or hydrate. The point is that they tend to fill the interstices of the centrifuged cake and thereby reduce its porosity.

For the manufacture of the beta anhydrous dextrose the temperature for each stage, according to my present invention, should be approximately 30° F. higher than for alpha anhydrous and the density of the liquor at 45° Baumé or above. This means that the density must be proportionately higher, otherwise supersaturation will be too low because of the increased temperature. The batch should be seeded with beta anhydrous crystals, dry or in the form of foots; the seeding being particularly necessary if the temperatures are lower than those indicated in order to bring out this type of crystals to the exclusion of the alpha anhydrous type.

I claim:

1. In the production of crystalline anhydrous dextrose from a starch converted solution by the method of crystallization in a vacuum pan: the improvement which comprises graining in a vacuum pan smaller than said first mentioned pan a charge of the solution considerably smaller than the capacity of the pan used for the remainder of the process, transferring the grained charge from the small pan to the large pan and intermittently adding to this grained charge relatively small charges of solution to bring about building up of the crystals in the grained charge without substantial induction of new crystals.

2. In the production of crystalline anhydrous dextrose from a starch converted solution by the method of crystallization in a vacuum pan: the improvement which comprises using as a grained charge foots from a previously crystallized batch and adding intermittently to this charge relatively small charges of the solution to bring about building up of the crystals of the grained charge without substantial induction of new crystals.

3. In the production of crystalline anhydrous dextrose from a starch converted solution by the method of crystallization in a vacuum pan involving a graining and a building up stage: the improvement which consists in raising the temperature of the massecuite at the end of the graining stage to, and maintaining it through a part at least of the building up stage at, a point to prevent any substantial induction of new crystals while permitting the deposition of solid phase from solution on the crystals already formed.

4. The method of claim 3 in which the batch is kept at a temperature above 120° Fahrenheit during the building up stage.

5. The method of claim 3 in which the temperature of the batch, after graining, is raised to approximately 160° Fahrenheit and thereafter gradually reduced.

6. The method of claim 3 in which the temperature of the batch is gradually reduced during the building up stage while the boiling is continued.

7. In the production of crystalline anhydrous dextrose from a starch converted solution by the method of crystallization in a vacuum pan: the improvement which comprises graining a charge of the solution considerably smaller than the capacity of the pan, adding thereto fresh solution to bring about the building up of the crystals of the grained charge without substantial induction of new crystals and maintaining the temperature during the first part of the building up stage of the process above the temperature of the graining stage.

8. In the production of crystalline anhydrous dextrose from a starch converted solution by the method of crystallization in a vacuum pan: the improvement which comprises graining a charge of the solution at a temperature of substantially 140° F., adding to this grained charge fresh solution to bring about building up of the crystals of the grained charge without substantial induction of new crystals and maintaining the temperature during the first part of the building up stage of the process at substantially 160° F.

9. Method of making beta anhydrous dextrose from a starch converted dextrose solution comprising graining a charge of the solution at a temperature approximately 170° F. with the liquor at a density of 45° Baumé and in the presence of previously formed beta anhydrous crystals; adding to the grained charge relatively small charges of the solution from time to time; and maintaining the temperature during the first part of the last mentioned stage of the process at approximately 190° F.

WILLIAM B. NEWKIRK.